United States Patent [19]

Henricson et al.

[11] Patent Number: 5,234,480
[45] Date of Patent: Aug. 10, 1993

[54] METHOD AND APPARATUS FOR DECREASING PROBLEMS CAUSED BY RESIDUAL OR REACTION GASES OR GASES HARMFUL TO A PROCESS

[75] Inventors: Kaj Henricson, Kotka; Raimo Pitkanen, Karhula, both of Finland

[73] Assignee: A. Ahlstrom Corporation, Noormarkku, Finland

[21] Appl. No.: 737,049

[22] Filed: Jul. 29, 1991

[30] Foreign Application Priority Data

Aug. 14, 1990 [FI] Finland .................................. 904002

[51] Int. Cl.$^5$ .............................................. B01D 19/00
[52] U.S. Cl. ........................................... 95/243; 95/19; 95/261; 96/207; 96/214; 162/56; 210/168
[58] Field of Search ...................... 55/52, 21, 185, 186, 55/202, 203, 97, 213; 162/56; 210/188

[56] References Cited

U.S. PATENT DOCUMENTS

| | | | |
|---|---|---|---|
| 4,435,193 | 3/1984 | Gullichsen et al. | 55/21 |
| 4,921,400 | 5/1990 | Niskanen | 55/52 X |
| 5,017,198 | 5/1991 | Schieg et al. | 55/21 |

FOREIGN PATENT DOCUMENTS

0155928B1 10/1988 European Pat. Off. .
0330387A2 8/1989 European Pat. Off. .
0267190B1 1/1991 European Pat. Off. .

OTHER PUBLICATIONS

Gullichsen, Johan et al., *Tappi*, Sep. 1981, "Medium—consistency technology", 64(9):113-116.

*Primary Examiner*—Charles Hart
*Attorney, Agent, or Firm*—Cohen, Pontani, Lieberman, Pavane

[57] ABSTRACT

The invention relates to a method and assembly for decreasing problems, especially odor hazards and interference with pump action, caused by residual or reaction gases, evolved or picked up in gas washers and various other partial process apparatuses of a pulp process. Residual or reaction gases and/or gases harmful to the carrying out of a process or to the environment are separated from liquid or fiber pulp suspension by means of a deaerating pump which advances the flow of liquid or fiber pulp suspension, separates said gases from said liquid or fiber pulp and vents said gases to outside said process apparatus. The invention concerns in general the use of a deaerating pump for a variety of purposes in the pulp and paper industry for eliminating gas problems.

10 Claims, 2 Drawing Sheets

METHOD AND APPARATUS FOR DECREASING PROBLEMS CAUSED BY RESIDUAL OR REACTION GASES OR GASES HARMFUL TO A PROCESS

BACKGROUND OF THE INVENTION

The present invention relates to a method for decreasing problems caused by the presence of residual and/or reaction gases entrained in a process liquid and to apparatus for carrying out such method. More particularly, the present method and apparatus especially relate to processes in the manufacture of pulp and paper.

A pulp or paper process is a sum of several successive sub-processes and reactions and as these progress, the amount of gases entrained in the liquid medium will increase and decrease. Often, the presence of such gases is undesirable to other sub-processes and to the final product resulting therefrom as well as to the environment. According to the traditional technology, residual and reaction gases are conveyed with the rest of the material out of a process into a degassing plant, where they are either released to the atmosphere or conveyed further into an effluent treatment.

Gas is present in pulp suspensions mainly in three forms, namely, in the form of small bubbles, dissolved or chemical bound gas.

The chemically bound gas or dissolved gas seldom causes problems in the pulp and papermaking processes but can cause problems if conditions are changed and bubbles start to form.

Gas bubbles in the fiber suspension can be present as free bubbles in the liquid between the fibers or as bound bubbles attached to fibers. Both bound and free bubbles cause problems in the papermaking processes. Free bubbles cause special problems in the pulp and papermaking processes when they are present in too great an amount. The problems include foam problems, instability of the processes, decreased deaerating, and the like.

Both free and combined gases impede pumping of the liquid in which such gas is entrained and, among other things cause pump cavitation, and, as a result of inadequate degassing, when gas gets into a pulp or paper process it may cause the following disadvantages:

free gas: foam problems; pinhole perforation of paper; instability in pipe conduits connected to screens, valves, etc.; decreased dewatering.

combined gas: dewatering problems; fiber flocculation; increased paper capillarity; decreased formability on a wire.

dissolved gas: if dissolved gas transforms to combined gas, it will exhibit the same problems as combined gas.

The method of the present invention relates to the separation and removal of most of the free air bubbles so that the problems caused by an excess amount of free air bubbles is eliminated.

Total gas removal is generally accomplished by another type of gas removal, so-called mechanical gas separation. With this method, all of the free and bound gas bubbles are removed. Also part of the dissolved gas is removed. This type of gas removal is performed immediately in front of the paper machine forming section to avoid pinholes and other problems on the forming wire. This method, which is described by K. D. Kurz, Tappi Engineering Conference, Sep. 19-21, (1978), is expensive and creates large amounts of foam when the fiber suspension is ejected with high speed onto a metal surface in a vacuum tank.

The traditional degassing assemblies in the pulp and paper industry are remarkably space demanding and hence costly, and the separated gas occurs in large volumes, from which reclaiming and conveying thereof is difficult. The most usual degassing equipment is a tank having a large diameter in which the gas in a gas contained liquid is permitted to rise to the liquid surface of the tank for removal. In order to be certain that a sufficient time period for degassing is given, the diameter of such a tank in large pulp plants can be 10-20 m and the height 5-6 m. It will thus be apparent to persons of ordinary skill that investment costs for a degassing tank of this kind are high and the reclaiming of gas therefrom is difficult.

SUMMARY OF THE INVENTION

One object of the present invention is to eliminate problems and disadvantages for any process and final product caused by the presence of air or gas, both by accomplishing an economically advantageous and efficient degassing and by means thereof eliminating both process problems and problems caused by the presence of residual or reaction gases.

The invention is based on the new basic idea that feed, circulation and/or discharge lines of a gas washer, a reaction tank or any partial process apparatus in pulp and paper making is provided with a deaerating pump, whereby to accomplish both a flow and efficient degassing of mixed and residual or reaction gases before and/or after any such process. The invention has special advantageous applications in certain partial processes, especially a digesting process which can be stabilized by this invention and the capacity thereof can be increased.

The impeller of a centrifugal deaerating pump includes a gas channel for conveying gas which is separated from the entraining liquid by the pump and gathers centrally forward of the pump impeller to a place behind the impeller, where the gas is evacuated by means of a vent. Usually a vacuum pump is connected to said vent to maintain an under pressure condition in the vent to enhance the flow of the gas out of the deaerating pump through the vent.

Commercially there is available, e.g. from the assignee hereof, A. Ahlstrom Corporation, a degassing so-called MC ®-pump, which is suitable to achieve the objects of the present invention, because the pump is designed for cavitation elimination when gas or air containing liquids and suspensions are meant to be pumped. Another pump suitable for use as a deaeration pump in this invention is the pump illustrated in FIG. 4 of U.S. application filed concurrently herewith by J. Elonen, et al., for Method And Apparatus For Improving Flotation Separation, and assigned to the assignee hereof. Yet another example of a deaerating centrifugal pump useful in carrying out this invention is another pump manufactured and sold by the assignee hereof, A. Ahlstrom Corporation, under the trademark AHLSTAR ™ equipped with AIRSEP ™ degassing.

Another object of the present invention is the use of a deaerating pump in the paper and/or pulp industry generally, because it has been discovered to be suitable without exception in nearly all applications in paper and/or pulp factories, to increase the stability of a process, and to eliminate to a remarkable degree gas and foam problems harmful to a process.

The following is a list of the major applications for the present invention:

| Sub-Process and Apparatus - | Location of Deaerating Pump |
|---|---|
| ENVIRONMENTAL CONTROL TECHNOLOGY: | |
| band filter press - | suspension feed pump and filtrate discharge pump |
| sedimentation - | feed pump |
| decaying tower - | discharge pump |
| slurry-ESP - | feed pump |
| RECLAIMED FIBER LINE TECHNOLOGY: | |
| pulper - | discharge pump |
| flotation - | feed pump and discharge pump |
| filters - | suspension feed pump and filtrate discharge pump |
| dithionite bleaching - | suspension feed pump |
| high consistency press - | suspension feed pump |
| CENTRIFUGAL CLEANING PLANT: | |
| cleaning - | deaerating pump and reed pump for pulp and water |
| PAPER MAKING MACHINE: | |
| pulper - | discharge pump |
| centrifugal cleaner - | feed pump |
| wire - | water discharge pump |
| paper machine - | feed pump for feeding pulp to the machine via a basis weight valve and circulation water pump and deaerating pump |
| curved screen - | pulp feed pump and filtrate discharge pump |
| PULP PLANT (chemical pulp): | |
| debarking plant etc. - | circulation water pump |
| chip washing - | circulation water pump |
| continuous digesting - | circulation liquor pump and discharging pump for a flash tank |
| batch digesting - | blow off pump |
| washing - | circulation water pump and suspension feed pump and filtrate discharge pump in a filter |
| pressurized washer - | circulation pump and suspension feed pump and filtrate discharge pump |
| bleaching - | feed pump for the filter and filtrated discharge pump |
| screening - | suspension feed pump |
| drying machine - | suspension feed pump and white water pump |
| PULP PLANT (mechanical pulp): | |
| grinder - | discharge pump |
| screening - | pulp feed pump |
| dithionite bleaching - | pulp feed pump and feed pump to press high consistency |
| bleaching - | feed pump to press |
| filters - | pulp feed pump and filtrate discharge pump |

BRIEF DESCRIPTION OF THE DRAWINGS

The invention is described in the following specification in an exemplary way by means of few advantageous embodiments thereof with reference to the accompanying drawings, wherein.

DETAILED DESCRIPTION OF PREFERRED EMBODIMENTS

As used throughout this specification (including claims), the word "gas" is intended to include any and all gases, whether free, combined or dissolved, including by way of example only air; and the expression "deaerating pump" or degassing pump is intended to mean a centrifugal pump capable of separating gas (as above defined) from the working liquid passing through the pump, which includes a gas channel for conveying separated gas from a zone upstream of or in front of the impeller to a zone downstream of or in back of the impeller, said pump further including a vent to permit the removal of said separated gas from the pump. Examples of suitable deaerating pumps are a pump sold as a degassing MC® pump by the assignee of the present invention, A. Ahlstrom Corporation, another pump sold by said assignee under the trademark AHLSTAR TM equipped with AIRSEP TM degassing. Also as used herein, the term "liquid" is intended not only to embrace liquids as conventionally defined but also slurries and suspensions which flow like liquids or are caused to flow through a deaerating pump like a liquid.

Figure 1:
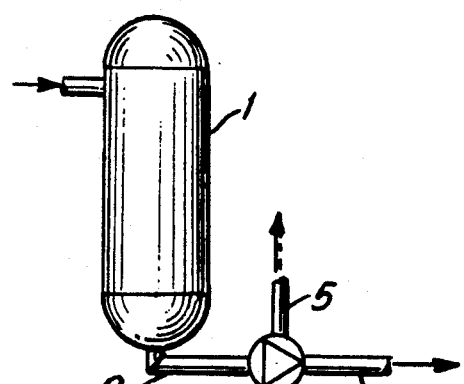
FIG. 1 is a schematic diagram of a batch digester incorporating the present invention.

Turning now to the drawings in detail, FIG. 1 schematically illustrates a container in the form of a batch digester 1 for pulp, wherein, after the digesting stage, the pulp suspension is discharged from digester 1 by a deaerating pump 3 disposed in a pulp suspension discharge line 2. In order to avoid possible subsequent environmental odors due to the gas developed during the digesting process, the developed gas is separated from the pulp suspension to be removed from said discharge line 2 and other processing equipment (not shown) through a vent or outlet duct 5 of the deaerating pump 3, which also serves as the pulp suspension discharge and feed pump in the discharge line 2. Specifically, the pump 3 includes a liquid outlet duct 4 and a gas vent 5 for yielding essentially gas-free pulp suspension in outlet duct 4. The gas exhausted via the gas vent 5 may be conveyed further into a gas gathering line (not shown) for additional subsequent processing and/or recovery. In connection with FIG. 1, it should be mentioned that the structure illustrated therein, according to which deaerating pump 3 is connected to the output duct 2 of a reaction tank 1 for separating gases developed in the reaction tank from the pulp digested therein and in which the degassed pulp is discharged by the pump, is useful whenever there exists combined liquid and gas flows such as in collecting tanks etc., wherein gas will or may develop, in which case the gas may be separated from the liquid by the inclusion of one or more deaerating pumps.

Figure 2:
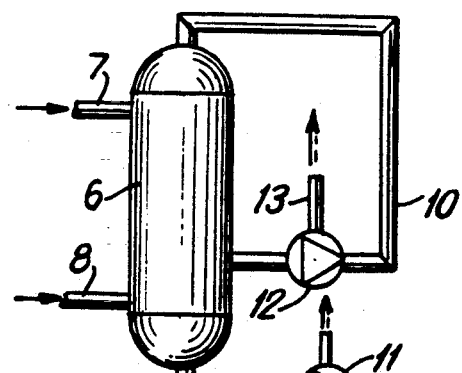
FIG. 2 is a schematic diagram of a continuous digester incorporating the present invention.

FIG. 2 presents schematically a continuous pulp digestion apparatus wherein a container in the form of digester 6 is provided with first and second input ducts 7 and 8, a pulp suspension or slurry outlet duct 9 which is connected to a deaerating pump 11. The digester 6 is also provided with a circulation conduit or recirculating loop 10 for circulating digesting liquor generated therein from digester 6 and back to the digester 6 by means of a deaerating pump 12. During the pulp digesting process, gas is evolved from the pulp in the digester 6 and if the gas is not removed it will cause not only a strong and unpleasant odor but it will decrease the rate of digestion in digester 6 and thus reduce the effective capacity thereof. Furthermore, the presence of such gas impedes the pumping of the pulp from the digester to other apparatus downstream therefrom. To eliminate gas problems and disadvantages, the gases are separated from the pulp suspension by means of the deaerating pump 12 which separates the entrained gas from the digesting liquor and provides a separate outlet duct or vent 13 for the separated gas. Pump 12 is connected so as to pump the separated digesting liquor through the circulation conduit or loop 10 and back into digester 6. From the gas outlet duct or vent 13, the separated gas can be recovered or piped to a special gas gathering line (not shown).

Referring still to FIG. 2, it should be noted that the gas handling solution illustrated therein, according to which there is a deaerating pump connected into the circulation conduit 10 of the reaction tank 6 for separating gas developed in the reaction tank from the digesting liquor which is recycled by the pump, can be employed more widely for separating gas from liquid or slurry to be fed forward to downstream apparatus. It is always desirable in the use of a reaction tank, collecting tank or conduit in which gas is either generated or otherwise present, which is provided with a recycle conduit or loop to include a deaerating pump in the recycle loop. Also to maximize the degassing performance of such apparatus, it is advantageous to also employ as the discharge pump a deaerating pump 11 connected to outlet conduit 9 of the apparatus, as shown in FIG. 2.

Figure 3:
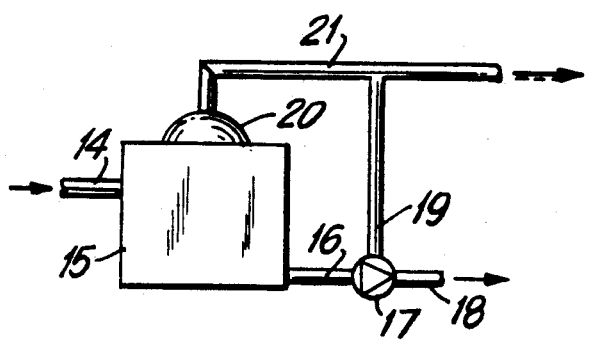
FIG. 3 is a schematic diagram of apparatus for carrying out an anaerobic process incorporating the present invention.

FIG. 3 shows schematically an anaerobic process for effluent purification, which kind of a process develops remarkably large quantities of gases. If such gases are left unremoved or untreated, they will cause not only serious environmental hazards but also they will cause serious pumping problems as well. As can be seen from FIG. 3, effluent intended to be purified is introduced by an input conduit 14 into a container in the form of a purification tank 15, wherein it is purified, as by an anaerobic process which, at the same time, develops gases. The developed gases rise to the upper part of tank 15 into a gathering space 20, which is connected to an exhaust duct 21 for the removal of these gases. Purified effluent is discharged from the tank 15 by a pump 17 through a discharge conduit 16.

In this kind of an anaerobic purification process, not all of the developed gases will separate from water and rise into the gathering space 20. Instead some remains in and is carried with the purified effluent either as free gas or as combined or dissolved gas, and may hence cause serious gas problems, e.g. odor hazards and pumping problems. To separate the gas left with the purified effluent and hence eliminate gas hazards and problems, the pump 17 connected to the discharge conduit 16 is a deaerating pump having a separate outlet duct or vent 19 for separated gas and a separate outlet duct 18 for degassed and purified effluent. The gas vent 19 may be connected, for example, to the gas exhaust conduct 21 mentioned above, as shown in FIG. 3, or it may be directed elsewhere. In this connection it should be noted that the apparatus of FIG. 3 is suitable not only for an anaerobic process but is usable also for any process wherein, inside a gathering tank, gathering conduit or reaction tank, gases will or may develop. In such apparatus to avoid problems, especially pumping problems caused by gases, it is most preferable to separate them and the deaerating pump achieves this in the simplest and most direct way.

Another example of an apparatus benefitting from the present invention is an expansion tank, wherein black liquor fed therein at temperatures of e.g. about 120° C. is permitted to expand, as, for example, to a temperature of about 100° C., whereby gases and foam are developed in the tank. However, all the gases and foams so developed are not able to exit through the gas outlet duct 25 but remain as partially mixed with the suspension where it may cause serious residual gas and foam problems. These problems can be eliminated by using according to the present invention a deaerating pump as the discharge pump.

Figure 4:
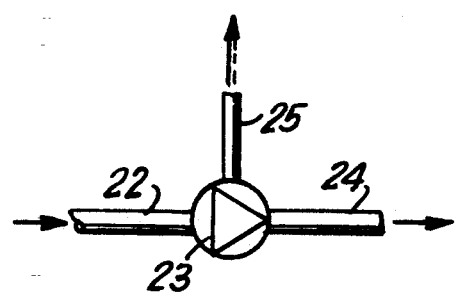
FIG. 4 is a schematic diagram illustrating an evaporating plant including a condensate conduit equipped with a deaerating pump in accordance with the present invention.

An evaporating plant forms large amounts of condensates, which contain either free, combined or dissolved gas. Often, when such gases are released to the environment they cause odor hazard. In FIG. 4, a solution to this problem is presented in which gases are separated from condensate by means of deaerating pump 23 connected to a condensate discharge conduit 22. The deaerating pump not only produces condensate flow through conduit 22-24, but by means of its separate outlet duct or vent 25 separates the gas from the condensate for further processing downstream. Once more it should be noted that the illustrated solution is not limited only to a condensate conduit from the evaporation plant but is in general useful for pumping all kinds of liquids and suspensions which contain or may contain gas, whereby liquid or suspension is transformed to an essentially gas-free state and the separated gases, often with a hazardous odor, are gathered from the vent 25 of pump 23.

Another advantageous embodiment of the present invention may be found in dithionite bleaching of fiber suspension, wherein the bleaching must be carried out inside a large volume reactor at a consistency of below 3%. To further complicate the process is the fact that dithionite is destroyed if it gets into contact with either free oxygen or with oxygen mixed with the suspension. By use of the present invention, that is by using a deaerating pump as the feed pump for the dithionite bleaching reactor, the oxygen bearing gas is separated from the suspension to be bleached, thus assuring a substantially oxygen free suspension. This makes it possible to feed dithionite into the suspension immediately at the liquid outlet of the feed pump thereby eliminating any need for a large volume reaction tank in which the bleaching takes place and the need for decreasing the consistency of the suspension to the low level mentioned above (e.g. 3%). Since dithionite bleaching can be carried out in suspensions of a consistency between 2-16% with the oxygen removed, the deaerating feed pump, preferably of the degassing MC ® pump variety, in addition to increasing the traditional dithionite bleaching at low consistencies also opens up the possibility for dithionite bleaching to be performed in a small size reactor at consistencies between 2 and 8%.

Another application of the present invention is in a feed to a container such as a sedimentation pond. In a sedimentation pond, large particles tend to sink to the bottom. If a pulp suspension fed into the sedimentation pond contains gas which may be partly mixed in the suspension and partly adhering to the large particles, the bubbles act to prevent or retard the large particles from sinking. Instead, due to the buoyancy of the bubbles, such particles may rise to the surface causing a serious odor hazard as well as diminished sedimentation performance. When a deaerating pump is used as the feed pump for a sedimentation pond, it becomes possible to separate from the suspension the gas mixed or entrained therein, whereby to permit the large particles to sink to enhance the sedimentation action and to reduce the smell.

Figure 5:
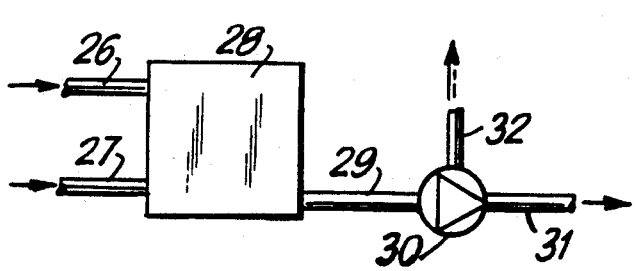
FIG. 5 is a schematic diagram of a reject conduit equipped with the present invention for solving a carbon dioxide problem.

When producing paper culled paper may be formed which is slushed in a so-called pulper by means of heavy disintegration. Thereafter, the resultant fiber suspension is conducted into a so-called broke mass conduit. FIG. 5 represents schematically this advantageous embodiment of the present invention for solving a residual gas and carbon dioxide problem produced by the pulper in such a use. As can be seen from FIG. 5, the broke pulp meant to be treated is fed into a container in the form of a reactor 28 through a first input duct 27 and filler is fed in through a second input duct 26. By the disintegration of the broke pulp into pulp, large amounts of air and gases are mixed with the pulp and when the broke pulp and filler react in the reactor 28, gas is produced, especially carbon dioxide gas. The treated gas containing pulp is discharged through a discharge or outlet conduit 29 of the reactor 28. According to the present invention said pulp discharge is carried out by pumping with a deaerating pump 30, whereby the gases are separated from the treated pulp as the deaerating discharge pump 30 for the treated pulp operates. Deaerating pump 30 includes a separate discharge duct or outlet 31 for the pulp and a separate exhaust duct or vent 32 for the gas separated in the pump. Once again it should be noted that the illustrated solution, while shown for elimination of gas problems in a broke line, has general application for the removal of gas to eliminate problems caused by the mixing of different substance streams.

Figure 6:
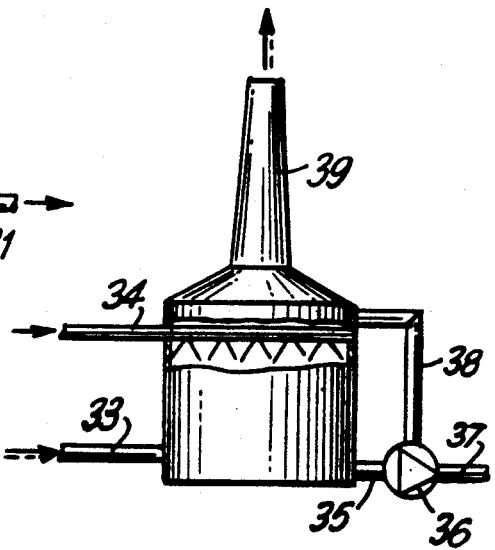
FIG. 6 is a schematic diagram of a gas washer including the present invention.

Flue gases and waste gases from chemical reactions often contain remarkable amounts of impurities, often gaseous. FIG. 6 illustrates a traditional prior art solution for gas treatment in such cases, i.e. by means of a container in the form of a gas washer or scrubber for removing the harmful gas fraction, but modified in accordance with the present invention. In this solution gases enter the gas scrubber via a channel or inlet 33 and scrubbing liquid is introduced through a liquid input duct 34. In the upper part of the gas scrubber the liquid is sprayed by suitable means into the scrubber chamber among the gases, whereby the most essential part of the harmful fraction of the gases is removed by the liquid droplets by adsorption or by reaction with purification chemicals existing therein or both and is carried with the scrubbing liquid to the lower part of the gas scrubber, where the spent scrubbing liquid is discharged by a pump 36 connected to a discharge conduit or outlet 35. The problem in the prior art is that the liquid droplets pick up not only the harmful fraction of the gases but also other gas compounds, which are carried into the pump 36 and thus cause, when released to the environment, serious odor hazards as well as pump cavitation which interferes with the normal operation of the pump. According to the present invention and as shown in FIG. 6, the potential risks and disadvantages caused by gases adsorbed in the gas scrubber to the scrubbing liquid are eliminated by using a deaerating pump as the discharge pump 36 for the washing liquid, which pump includes a liquid outlet duct 37 for the essentially gas-free liquid and a separate outlet duct or vent 38 for gases separated from the liquid in the pump. In the embodiment according to FIG. 6 the separated gas is recycled by vent 38 back into the upper part of gas scrubber, preferably above the level at which the scrubbing liquid is sprayed into the scrubber, whereby the recycled gas is free to be released through an outlet duct or stack 39 for such purified gas. Clearly the invention is not limited only to gas scrubbers by can enjoy general use for purification of gassy substances free of waste fraction by using a solution principal based on the same basic idea as employed in FIG. 6.

Figure 7:
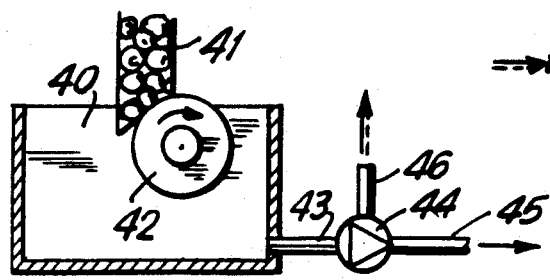
FIG. 7 is a schematic diagram of apparatus for converting wood into a fiber suspension.

Turning now to FIG. 7, when producing fiber suspension from wood logs 41 or other wood source, as by means of a rotating grinder 42, a remarkable amount of gas is formed in a container in the form of pond 40 which makes it difficult to discharge the fiber suspension from the pond. In order to overcome this problem, a deaerating pump 44 is connected to the discharge conduit or outlet 43 of pond 40. Deaerating pump outlet 45 constitutes a separate discharge duct for the essentially gas-free fiber suspension, a separate discharge duct or vent 46 being provided for the gas separated from the fiber suspension in the pump. The gas discharge duct 45, 46 can be connected to a gas gathering line, whereby to eliminate the risk of odor hazards that might result from direct discharge into the atmosphere. This illustrated solution according to the present invention is not limited only to the elimination of gas problems arising from fiber suspension ponds but may be generally employed to avoid problems caused by gases evolved in each of the individual partial processes employed in the fiber producing process.

Figure 8:
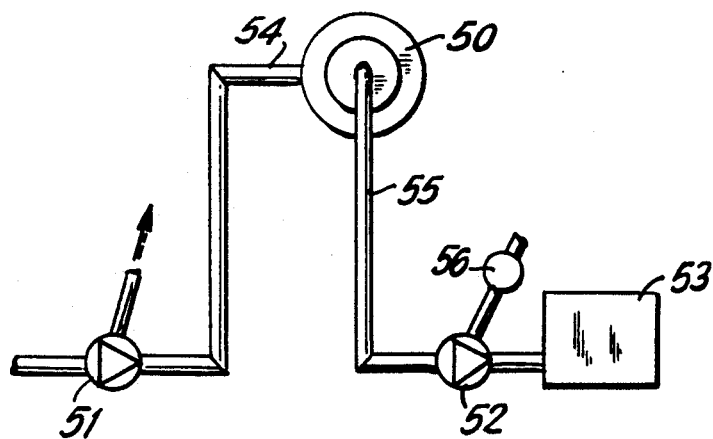
FIG. 8 is a schematic diagram of a suction filter provided with a suction leg incorporating the present invention.

FIG. 8 illustrates yet another advantageous embodiment of the present invention in connection with a container in the form of a suction filter 50 provided with a vertically extending suction leg 55. Pulp suspension to be filtered is pumped by a deaeration pump 51 into the suction filter 50 and the filtrate from filter 50 is removed by suction applied by the suction leg 55 and a filtrate discharge deaeration pump 52. Pump 52 feeds the filtrate to downstream apparatus such as, for example, a filtrate tank 53. In the prior art in which deaeration pumps were not employed, a common problem for such a suction filter was that air or gas carried with the suspension into the filter penetrated the filter and was then carried out of the filter with the filtrate into the suction leg 55. Since gas, because it is lighter than the suspension, tends to accumulate in the suction leg and thus builds up a gas column, the hydrostatic height of the liquid column inside the suction leg was decreased and hence the suction influence of the suction leg was decreased. A second problem relating to gas in such a filtering system is the fact that gas decreases the efficient flow area of the suspension both inside the feed conduit 54 and the filter drum 50, whereby an optimal capacity cannot be achieved by the filter. However, gas problems are remarkably decreased by the inclusion of a filtrate discharge pump 52 of the deaerating type as has been described heretofore. Then the piling up of a gas column in the suction leg 55 is prevented which otherwise interferes with the normal function of the suction filter. However, one disadvantage in this apparatus is that the filtrate discharge pump 52 is preferably large to produce a large under-pressure condition at its inlet in order to make sure that the suction leg is in an under-pressure condition and the deaeration pump 52 is effectively degassifying. The effectiveness of the pump 52 may be improved by connecting to the vent of deaerating pump 52 a vacuum pump 56 to enhance the removal of gasses separated in the pump 52. Moreover, the deaerating pump 51 connected to the suspension feed conduit 54 minimizes the amount of gas carried with the suspension into the suction filter 50 which can penetrate the drum, to thereby increase the efficient flow area of the suspension and the amount of the suspension entering the filter 50 per unit of time, which in turn increases the capacity of the suction filter 50. Further the amount of the gassy substance carried into the suction leg 55 is decreased to thereby maintain the suction effect in the suction leg more reliable and steady. The degassing filtrate discharge pump 52 and the under pressure source or vacuum pump 56 connected thereto can be made smaller, because the amount of the gassy substance carried into the discharge pump is reduced by the degassing action of the suspension feed pump 51, and as a result, there no longer exists a need to compensate for the decreased suction effect caused of the gassy substance carried with approaching suspension as in the prior art.

Figure 9:
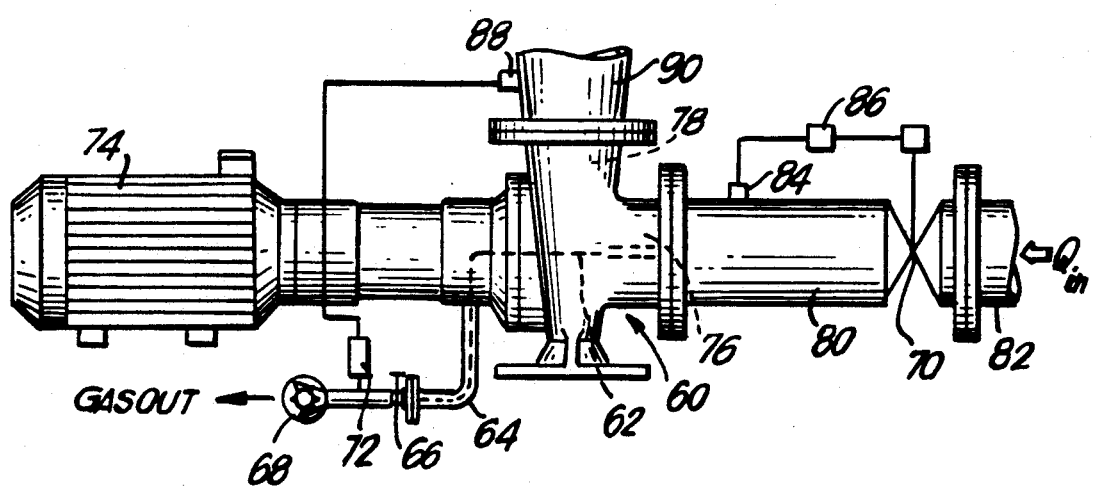
FIG. 9 is a schematic illustration of a preferred control circuit for a degassing pump for practicing the method of the present invention.

As shown in FIG. 9, the deaerating pump for use with the apparatus and method of the present invention preferably comprises a centrifugal pump 60 with a channel 62 within the pump which is connected to an exterior gas discharge pipe 64, and via valve 66 to a suction or vacuum pump 68, which can be, for example, a well-known NASH-pump. The drawing also schematically illustrates control valves 70, 72 for controlling the reduced pressure generated by suction pump 60. The centrifugal pump 60 has, as is known, a motor 74, a suction opening 76 and a pressure opening 78. A suction duct 80 is mounted to the suction opening. The duct 80 is connected by valve 70 to the inlet pipe 82 for the fiber suspension. The control circuit further comprises a pressure sensor 84 connected to the suction duct 80 and a control unit 86 which is connected to valve 70 to regulate the operation of the valve.

In operation, the fiber suspension is drawn by pump 60 into suction duct 80 through valve 70 from inlet pipe 82. The flow is constricted by valve 70 in such a way that a reduced pressure is generated in the suction duct and in the suction opening 76 of the pump thereby facilitating the separation of gas from the fiber suspension. Hence, the flow is throttled as much as possible short of avoiding boiling thereof thereby maximizing air removal. Pressure sensor 84 in the control circuit and control unit 86 maintain the pressure in the suction duct sufficiently high to prevent the suspension from boiling due to the reduced pressure. In this manner the amount of gas separated from the suspension in front of the impeller is as great as possible and the separated gas is discharged from the centrifugal pump 60 via the conventional route. Thus, centrifugal pump 60 is pumping suspension through pressure opening 78 and the gas content of the suspension is considerably lower than that of the suspension in the inlet pipe 82. Control unit 72 and pressure sensor 88 also control the pressure difference between the air bubble created in front of the pump impeller and the pressure in discharge pipe 90 to maintain the pressure differential at the desired level.

The invention is described above only by a way of examples referring to a few advantageous embodiments thereof. This is meant by no means to limit the scope of the present invention but on the contrary to show the nearly unlimited application possibilities of the present invention. Accordingly several means and applications of the use of the invention as well as variations and combinations thereof are possible within the scope of the accompanying claims.

What is claimed is:

1. A method of reducing problems in a suction filter caused by gas entrained in a pulp suspension, said suction filter including a filter tank, a suspension feed conduit connected to the filter tank for supplying pulp suspension thereto, an outlet, and a vertically extending suction leg connected to the outlet, said method comprising the steps of:
   a. causing the pulp suspension to flow through the suction filter in part at least by a deaerating pump connected adjacent the bottom of the suction leg, said deaerating pump imparting said flow to said pulp suspension and separating said entrained gas therefrom; and
   b. venting said deaerating pump through a gas vent therein for removing separated gas therefrom.

2. The method of claim 1, and further comprising collecting the filtered fiber suspension in a filtrate tank connected to the outlet of said deaerating pump.

3. The method of claim 1, wherein said step of causing said fiber suspension to flow through said filter is performed in part by a second deaerating pump connected to said suspension feed conduit.

4. The method of claim 1, further comprising the step of backing separated gas from said deaerating pump by means of a vacuum pump connected to said vent of said deaerating pump.

5. The method of claim 4, wherein said step of causing said fiber suspension to flow through said filter is performed in part by a second deaerating pump connected to said suspension feed conduit.

6. The method of claim 5, and further comprising collecting the filtered fiber suspension in a filtrate tank connected to the outlet of said first mentioned deaerating pump.

7. Apparatus for processing a liquid having gas entrained therein, said apparatus comprising a suction filter comprising a filter tank, a suspension feed conduit for supplying suspension to said filter tank, a vertically extending suction leg for providing an outlet passage from said filter tank for filtrate and for creating an under-pressure to pull filtrate from said tank; means for removing entrained gas from said liquid, said removing means including a deaerating pump for circulating said liquid, said deaerating pump being connected to the lower end of said suction leg and including means for separating said entrained gas from said liquid, and a vent for providing an outlet for said separated gas from said deaerating pump.

8. Apparatus for processing a liquid having a gas entrained therein in accordance with claim 7, and further comprising a vacuum pump connected to said vent of said deaerating pump.

9. Apparatus for processing a liquid having a gas entrained therein in accordance with claim 7, and further comprising another deaerating pump, said other deaerating pump being connected into said feed conduit for feeding suspension to said filter tank and for degassing said suspension prior to filtration, whereby said first mentioned deaerating pump separates gas from said filtrate that was primarily generated in said filter tank.

10. Apparatus for processing a liquid having a gas entrained therein in accordance with claim 9, and further comprising a vacuum pump connected to said vent of said deaerating pump.

* * * * *